United States Patent [19]

Christenson et al.

[11] Patent Number: 4,892,424
[45] Date of Patent: Jan. 9, 1990

[54] THRUST BEARING

[75] Inventors: Carl R. Christenson, Bethlehem; Richard L. Alling, Torrington, both of Conn.

[73] Assignee: The Torrington Company, Torrington, Conn.

[21] Appl. No.: 250,657

[22] Filed: Sep. 29, 1988

[51] Int. Cl.[4] .............................................. F16C 33/64
[52] U.S. Cl. ...................................... 384/620; 384/622
[58] Field of Search ................................ 384/618–622, 384/584, 590, 623

[56] References Cited

U.S. PATENT DOCUMENTS

| | | | |
|---|---|---|---|
| 3,713,713 | 1/1973 | Ailling et al. | 384/622 |
| 3,900,235 | 8/1975 | Ailling et al. | 384/622 |
| 3,913,994 | 10/1975 | Ailling et al. | 384/623 |
| 3,937,541 | 2/1976 | Ailling et al. | 384/622 |
| 4,174,138 | 11/1979 | Johnston | 384/623 |
| 4,696,588 | 9/1987 | Tanaka et al. | 384/622 X |
| 4,733,979 | 3/1988 | Tsuruki | 384/622 X |

Primary Examiner—Thomas R. Hannon
Attorney, Agent, or Firm—Frank S. Troidl

[57] ABSTRACT

A cage and roller assembly in a hardened thrust bearing race is restrained within the race by heating a plurality of circumferentially widely separated parts of the race lip to soften the lip parts and bending the softened parts over the cage of the cage and roller assembly. An apparatus for assembling the thrust bearing includes a pair of electrodes located to apply a current through the lip to soften the lip and a form punch which is constructed to bend the softened part of the lip over a cage and roller assembly to an acute angle with repect to the rest of the lip.

8 Claims, 3 Drawing Sheets

THRUST BEARING

This invention relates to thrust bearings. More particularly this invention is a new thrust bearing race, method of making a thrust bearing, and apparatus for making a thrust bearing.

Three currently manufactured thrust bearings which have means for retaining a cage and roller assembly within a thrust bearing race are known as formed tabs, full 360° curl and banding. The U.S. Pat. 3,900,235 dated Aug. 19, 1975 to Richard L. Alling et al and entitled "TAB RACE" describes a thrust bearing with a race having formed tabs to retain the cage and roller assembly. The U.S. Pat. 3,913,994 dated Oct. 21, 1975 to Richard Alling et al and entitled "BEARING OFFSET LIP CAGE" describes, among other things, a full 360° curl for retaining the cage and roller assembly. The U.S. Pat. 4,174,138 dated Nov. 13, 1979 to Dean E. Johnston and entitled "THRUST BEARING AND SEPARATOR" describes a thrust bearing including a band for retaining the cage and roller assembly.

Several problems are associated with the formed tab. The press tooling is complex and must be run slowly. The tooling requires a good deal of maintenance. The dimensions of the tabs are difficult to maintain. Improper tabs can result in poor retention, interference with the bearing performance, or damage to the bearing when it is being assembled. These problems, when combined, result in a relatively high scrap rate.

The problems associated with the full 360° curl are the same as the formed tab, however, the dimensional tolerances are not quite as tight. The problems associated with the banded assemblies include the high cost of manufacturing one or two additional components, the added inventory, and assembly problems.

Our new thrust bearing race and new thrust bearing, method of making a thrust bearing, and apparatus for making a thrust bearing reduces costs and scrap.

With this invention, the tight dimensional tolerances required with formed tabs are not required. The additional component or components required for a banded assembly are eliminated. The complex tooling required to make formed tabs and a full 360° curl is not needed.

Briefly described, the thrust bearing race has a radially extending annular raceway between inner and outer peripheries. An integral annular lip having an inside surface and an outside surface extends axially from at least one. At least one stake has one surface protruding from and the other surface indented from corresponding surfaces of the lip at an acute angle with respect to said lip surfaces.

Briefly described, the new method of making a thrust bearing comprises placing a cage and roller assembly in a hardened thrust bearing race. The race has an axially extending lip. The cage has a portion extending radially to adjacent the inside of the lip, with the lip extending axially beyond the cage portion. A small axial and circumferential part of the lip is heated and softened. The softened part is bent to restrain the cage and roller assembly in the race. The stake may be bent over the cage of a cage and roller assembly or bent over another thrust race containing a cage and roller assembly to form a thrust bearing.

Briefly described, the apparatus for assembling the thrust bearing includes electrodes located to apply a current through an axial and circumferential part of the lip of a thrust race to soften a predetermined part of the free end of the lip. A form punch is used to bend the softened part of the lip to an acute angle with respect to the rest of the lip. The lip extends axially beyond the cage and roller assembly or a second thrust bearing race.

The invention, as well as its many advantages, may be further understood by referenced to the following detailed description and drawings in which.

In the various figures, like parts are referred to by like numbers.

Figure 1:
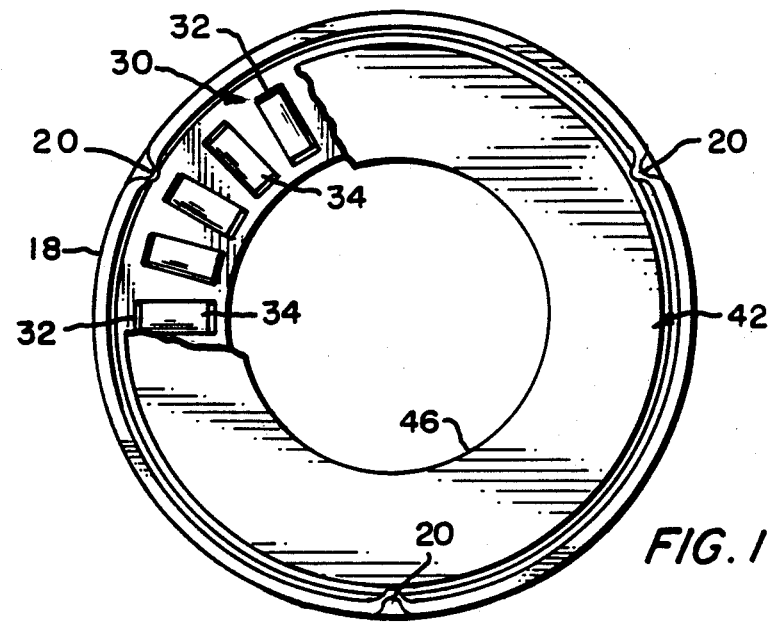
FIG. 1 is a plan view of a preferred embodiment of thrust bearing.
Figure 2:
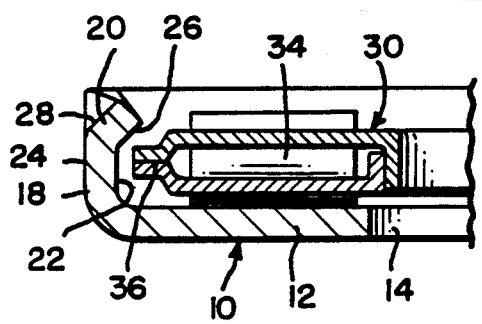
FIG. 2 is a fragmentary view of FIG. 1 on an enlarged scale with one thrust bearing race removed.

Referring to the drawings, and more particularly to FIG. 1, and FIG. 2, a thrust bearing is shown with a thrust bearing race 10 having a radially extending annular raceway 12, with a bore 14 for receiving a shaft (not shown).

A totally solid integral annular lip 18 extends axially from the outer periphery of the raceway. At least one, and preferably three, circumferentially widely spaced stakes 20, are provided at the free end of the lip 18. In the embodiment shown, the stakes 20 are arcuately spaced apart about 120°.

Referring to FIG. 2, it can be seen that the lip 18 has an annular inside surface 22 and an annular outside surface 24. Each stake 20 has an inside surface 26 extending inwardly toward the axis of the race at an acute angle with respect to the inside surface 22 of the lip 18 and an outside surface 28 indented inwardly toward the axis of the race at an acute angle with respect to the outside surface 24 of the lip 18. The stakes 20 are used to restrain axial movement of a cage and roller assembly. The cage 30 has circumferentially separated pockets 32 which circumferentially separate rollers 34. The cage 30 has an annular radially extending portion 36 which extends to adjacent the inside surface 22 of the lip 18. The lip 18 extends from the raceway 12 over and beyond the cage portion 36. The inside diameter of each stake 20 is less than the diameter of portion 36 of cage 30 so that the cage and roller assembly is retained in the hardened race 10.

For some applications, the thrust race and cage and roller assembly of FIG. 2 may be used as a thrust bearing without the second race 42 opposed to the race 10.

Figure 3:
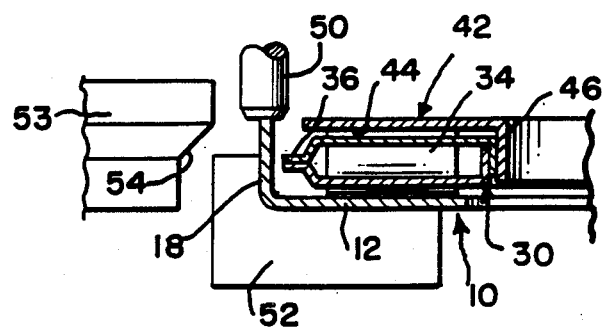
FIG. 3 is a view, partly in section, useful in explaining some of the initial steps in practicing our new method of forming stakes on an outer lip of a thrust race and also showing one type of apparatus for practicing the method.
Figure 4:
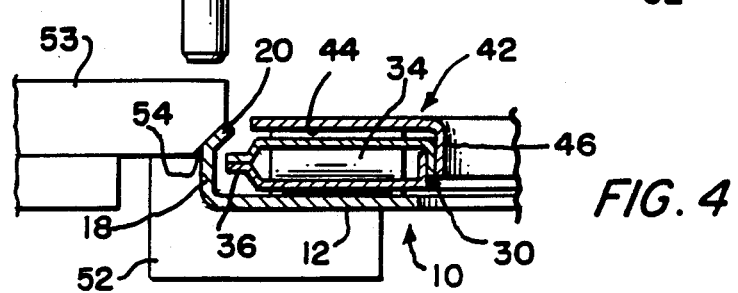
FIG. 4 is a view similar to FIG. 3 useful in describing some of the later steps performed in practicing our new method.

FIG. 3 and FIG. 4 illustrate an apparatus and method for making a thrust bearing assembly. The cage and roller assembly including the cage 30 having a radially extending portion 36 extending to adjacent the lip 18 is placed in the hardened race 10. The opposed race 42 has a radially extending raceway 44 which is opposed to the radially extending raceway 12 of race 10. The race 42 also has an integral lip 46 which extends axially from the inner diameter of raceway 44.

Our new method of forming a thrust bearing includes the steps of assembling the bearing and then heating a small axial and circumferential area of the lip 18 to be able to form the stake 20 while it is still hot. It is necessary to form the stake while the area is hot since the raceways are hardened. Several methods of heating the small area of the lip before forming the stakes include, for example, resistance heating, induction heating, and laser heating. Resistance heating is shown in FIG. 3 and FIG. 4. An electrode 50 is brought into contact with the free edge of the lip 18. The other electrode 52 has a larger contact area with the thrust race 10 and contacts the race in the area that is not to be heated. Therefore, electrode 52 serves as a heat sink. After the area of the lip to be heated is hot, the electrode 50 is retracted and the form punch 53 is moved inwardly toward the heated area to form the stake 20 (see FIG. 4).

The electrodes 50 and 52 are located so that a current may be applied through an axial and circumferential portion of the lip 18 to soften a predetermined part of the lip which extends from the free end of the lip. The form punch 53 has an angled surface 54 for bending the softened part of the lip to the acute angle with respect to the rest of the lip.

Thus, the stakes serve to restrain the cage and roller assembly in the thrust bearing.

The electrodes are dimensioned to apply the current only over a small circumferential and axial portion of the lip to soften this small portion. For example, looking at FIG. 1, it can be seen that the stakes 20 only extend over a small part of the 360° surface of the lip 18. Also, of course, the angled surface 54 of the form punch 53 is dimensioned so that the softened part of the lip is the only part which is bent over. Three groups of electrodes and form punch may be used to form the three stakes 20 simultaneously. Alternatively, one group of electrodes and form punch may be used and the bearing may be rotated to make the stakes sequential.

By staking the bearing after it has been assembled, the tight dimensional tolerances required on the formed tab is reduced. Also, the additional band, or components, required for the banded thrust bearing assembly is not necessary. The complex tooling required for making the formed tabs in a formed tab bearing and the full 360° curl in the 360° curl bearing are not required.

Note that a separate punch 53 is used to form the stakes, from the electrodes 50 and 52 to soften the lip portion. This allows the electrode to be manufactured from a good electrode material and allows the form punch 53 to be manufactured from a good punch material. Often good electrode material does not make good punch material and vice versa. By separating the two, the electrode and punch lives are greatly improved because compromises do not have to be made during the material selection.

Figure 5:
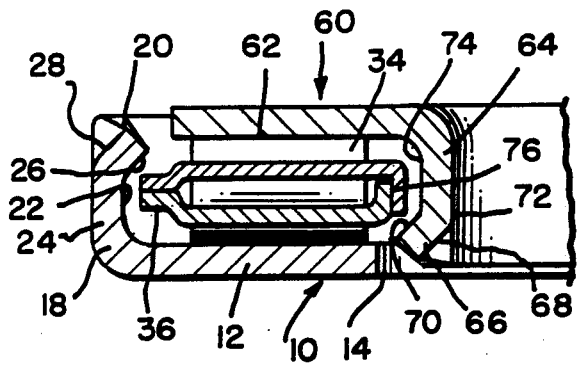
FIG. 5 is a fragmentary sectional view showing a thrust bearing with two races, one race having a staked outer lip, the other race having a staked inner lip.

In the embodiment of FIG. 5, a second thrust bearing race 60 having a raceway 62 opposed to the raceway 12 of thrust bearing race 10 has an axially extending inner annular lip 64. The annular lip 64 extends axially from the inner periphery of the raceway 62. At least one and preferably three circumferentially spaced apart stakes 66 have an inside surface 68 and an outside surface 70, which are in indented from and protrude from the inside surface 72 and outside surface 74, respectively of the lip 64 away from the axis of the race at an acute angle with respect to the lip.

The cage has an inner periphery 76 of less diameter than the outside diameter of the stake 66. Therefore, axial movement of the cage and roller assembly is restrained by the stake 66.

In the bearing embodiment of FIG. 5, axial movement of the cage and roller assembly in one axial direction is restrained by contact of the portion 36 of the cage with the stake 20 on hardened thrust race 10; axial movement of the cage and roller assembly in the other axial direction is restrained by contact of the portion 76 of the cage with the stake 66.

Figure 6:
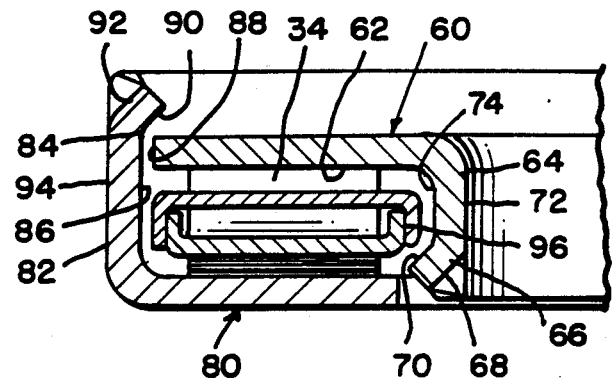
FIG. 6 is a fragmentary sectional view showing a thrust bearing with two races, one race having an outer lip with stakes over the outer periphery of the other race, the other race having a staked inner lip over the cage of a cage and roller assembly.

In the thrust bearing embodiment of FIG. 6, the hardened thrust bearing race 80 has an axially extending outer lip 82 which is somewhat longer than the axially extending outer lip of the other embodiments so that the stake 84 may extend over the outer periphery of the opposed thrust race 60 rather than over the cage of the cage and roller assembly. The thrust race 60 extends radially to adjacent the inside surface 86 of the annular lip 82. The annular lip 82 extends axially over and beyond the outer periphery 88 of the thrust race 60. Inner surface 90 and outer surface 92 of the stake 84 are integral with and extend axially at an acute angle toward the axis of the bearing from inner surface 86 and outer surface 94, respectively of the annular lip 82.

Axial movement of the cage and roller assembly and the thrust race 60 in one axial direction is restrained by contact of the outer periphery 88 of thrust race 60 with the stake 84; and axial movement of the cage and roller assembly and thrust race 80 in the other axial direction is restrained by contact of the inner periphery 96 of the cage and roller assembly with the stake 70 on the inner lip 64 of the thrust bearing race 60.

If desired, the inner annular lip of the race 60 could be made longer and rather than staking the thrust bearing race 60 over the cage and roller assembly, the thrust bearing race 60 could be staked over the inner periphery of the thrust bearing race 80.

Figure 7:
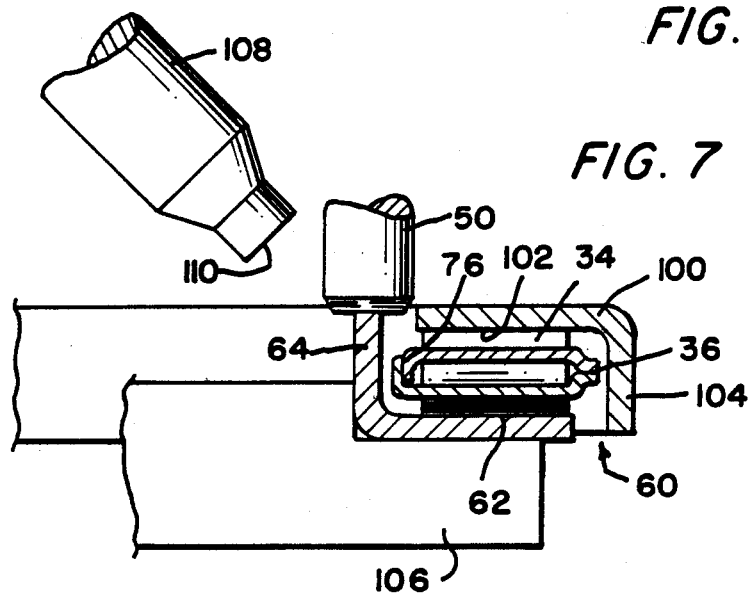
FIG. 7 is a view, partly in section, useful in explaining some of the initial steps in practicing our new method of forming stakes on an inner lip of a thrust race and also showing an apparatus for practicing the method.
Figure 8:
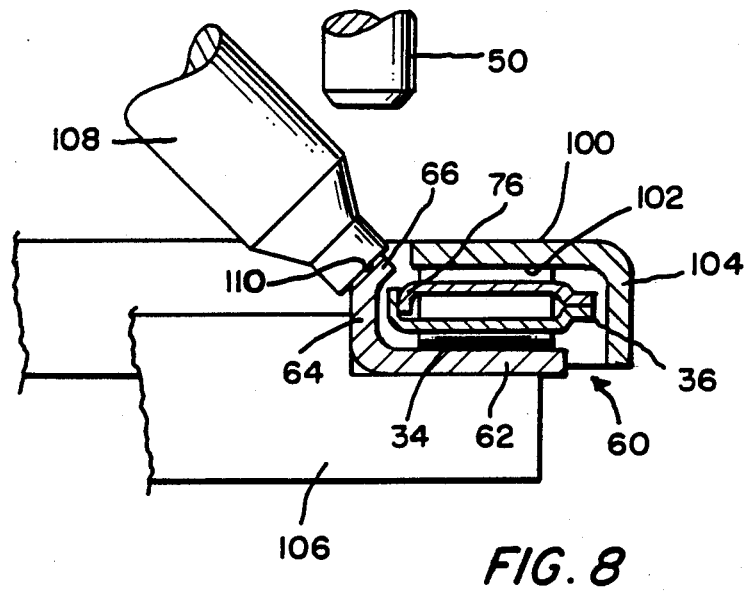
FIG. 8 is a view similar to FIG. 7 useful in describing some of the later steps performed in practicing the new method of FIG. 7.

FIG. 7 and FIG. 8 illustrate an apparatus and method for making a thrust bearing assembly with the annular axially extending inner lip of the race 60 staked over the cage inner periphery 76. The cage and roller assembly including the cage has a radially extending portion 76 extending to adjacent the outside of the lip 64. The cage and roller assembly has been placed in the hardened race 60. A second race 100 opposed to the race 60 is provided. The opposed race 100 has a radially extending raceway 102 which is opposed to the radially extending raceway 62 of race 60. The race 100 also has an integral lip 104 which extends axially from the outer diameter of the raceway 102. As with the heating of an outer annular lip on a thrust bearing, several methods of heating the inner annular lip of the thrust bearing of the embodiment of FIG. 7 and FIG. 8 may be used. This includes resistance heating, induction heating, and laser heating. Resistance heating is shown in FIG. 7 and FIG. 8. The electrode 50 is brought into contact with the free edge of the lip 64. The other electrode 106 has a larger contact area with the thrust race 60 and contacts the race in the area that is not to be heated. Therefore, electrode 106 serves as a heat sink. After the area of the lip to be heated is hot, the electrode 50 is retracted and the form punch 108 is moved outwardly at an angle toward the heated area to form the stake 66 (see FIG. 8).

The axis of the form punch 108 is at an angle of approximately 45° with respect to the axis of the bearing. Thus, the face 110 of the form punch is angled with respect to the inner annular lip 64 of the thrust race 60.

We claim:

1. A thrust bearing race comprising: a radially extending annular raceway having an outer periphery and an inner periphery; a totally solid annular lip integral with and extending axially from at least one of said peripheries, said lip having an inside surface and an outside surface, and at least one stake which has been bent after being heated and having an inside surface and an outside surface, one of said stake surfaces protruding from one of said lip surfaces, the other of said stake surfaces indented from the other of said lip surfaces, each stake surface being at an acute angle with respect to the associated lip surface.

2. A thrust bearing race in accordance with claim 1 wherein the annular lip extends axially from the inner periphery of the raceway, and the inside surface and outside surface of the stake are indented from and protrude from the inside and outside surfaces, respectively, of the lip away from the axis of the race.

3. A thrust bearing race in accordance with claim 1 wherein the annular lip extends axially from the outer periphery of the raceway, and the inside surface and outside surface of the stake protrude from and are indented from the inside and outside surfaces, respectively, of the lip toward the axis of the race.

4. A thrust bearing race in accordance with claim 3 wherein a plurality of stakes are circumferentially widely spaced on the lip.

5. A thrust bearing comprising: a race having a radially extending annular raceway with an outer periphery and an inner periphery; a totally solid annular lip integral with and extending axially from at least one of said peripheries, said lip having an inside surface and an outside surface, and at least one stake which has been bent after being heated and having an inside surface and an outside surface, one of said stake surfaces protruding from one of said lip surfaces, the other of said stake surfaces indented from the other of said lip surfaces, each stake surface being at an acute angle with respect to the associated lip surface; a cage and roller assembly with the cage having an outer periphery and an inner periphery, the diameter of at least one of said peripheries and the diameter of the stake being such that axial movement of the cage and roller assembly is restrained.

6. A thrust bearing in accordance with claim 5 wherein the annular lip extends axially from the inner periphery of the raceway, the inside surface and outside surface of the stake are indented and protrude from the inside and outside surfaces, respectively, of the lip away from the axis of the race; and the cage has an inner periphery of less diameter than the outside diameter of the stake whereby axial movement of the cage and roller assembly is restrained.

7. A thrust bearing in accordance with claim 5 wherein the annular lip extends axially from the outer periphery of the raceway, the inside surface and the outside surface of the stake protrude from and are indented from the inside and outside surfaces, respectively, of the lip toward the axis of the race at an acute angle with respect to the lip surfaces; and the cage has an outer periphery of greater diameter than the inside diameter of the stake whereby axial movement of the cage and roller assembly is restrained.

8. A thrust bearing in accordance with claim 7 wherein: a second race has a radially extending annular raceway opposed to the first race raceway.

* * * * *